United States Patent

Laessig

[15] 3,687,365
[45] Aug. 29, 1972

[54] THERMOSTATIC FLOW CONTROLLER

[72] Inventor: Rudolf Reinhold Laessig, Sunneytown, Pa.

[73] Assignee: General Electric Company

[22] Filed: Sept. 10, 1970

[21] Appl. No.: 71,026

[52] U.S. Cl. ................................. 236/99, 251/5
[51] Int. Cl. ........................................ G05d 23/02
[58] Field of Search ...................... 236/99; 251/4–7

[56] References Cited

UNITED STATES PATENTS

| | | | |
|---|---|---|---|
| 2,241,086 | 5/1941 | Gould | 236/99 X |
| 3,118,646 | 1/1964 | Markey | 251/5 |
| 3,252,227 | 5/1966 | Fleer | 34/45 |
| 3,445,085 | 5/1969 | Eckel et al. | 251/5 |
| 3,514,034 | 5/1970 | Cushman | 236/99 X |
| 3,517,881 | 6/1970 | Kohlbeck | 236/13 |

*Primary Examiner*—Edward J. Michael
*Attorney*—Allen E. Amgott, Henry W. Kaufmann, Frank L. Neuhauser, Oscar B. Waddell, Joseph B. Forman and Raymond H. Quist

[57] ABSTRACT

A fluid control device responsive to a sensed temperature wherein a material having a known coefficient of thermal expansion fills a chamber defined in part by a flexible diaphragm such that a change in temperature within a desired temperature range causes a proportional change in volume of the material to cause a change in cross-sectional area of a flow path which is defined at least in part by the diaphragm. In the preferred embodiment the material utilized is a wax which is chosen so that the desired temperature range is within the melting region of the wax.

5 Claims, 3 Drawing Figures

Patented Aug. 29, 1972

3,687,365

INVENTOR:
RUDOLF R. LAESSIG,
BY
ATTORNEY

THERMOSTATIC FLOW CONTROLLER

BACKGROUND OF THE INVENTION

The subject invention relates to fluid control devices and, in particular, to such devices which are responsive to temperature.

It is often necessary to control fluid flow in response to a temperature sensed. A thermostatic type device is frequently used for control of a heat exchange fluid or of a fuel for heating or cooling apparatus. In many instances a temperature sensor is used to produce an electrical output signal which controls a solenoid valve. In some thermostatic devices, a temperature change in a volatile liquid enclosed in a chamber causes a pressure change which acts via a connecting member to change the position of a valve member in a fluid valve. One device includes a fluid restrictor formed of an annular chamber whose inner surface is defined by a rubber sleeve, a volatile liquid and vapors thereof within the chamber and an electrical element for heating the liquid and vapors. When an electric current is supplied to the heater, a portion of the liquid vaporizes and the heated vapor causes increased pressure within the chamber so as to expand the diaphragm and reduce the flow path area between the surfaces of the sleeve. This last-mentioned device has the disadvantage that it requires an electrical signal to flow through the heater in order to effect flow control rather than operating directly in response to a sensed temperature.

SUMMARY OF THE INVENTION

Therefore it is an object of the subject invention to provide a simple, reliable flow control device responsive to temperature.

Another object of the subject invention is to provide a flow control device wherein the flow control is effected directly by a sensed temperature change.

In order to fulfill the above-stated objects, the subject invention provides a fluid flow controller including a chamber formed in part by a flexible diaphragm; means for defining with the diaphragm a fluid flow path; and, a non-gaseous material substantially filling the chamber, the material having a known coefficient of thermal expansion associated with its solid/liquid phase change, wherein the desired temperature control range for the controller is within the temperature range associated with the phase change. In the preferred embodiment, this material is a wax. As the temperature increases, the material begins to melt and expands. This causes the diaphragm to be moved so as to further restrict the flow path. The subject matter which is regarded as the present invention is particularly pointed out and distinctly claimed in the concluding portion of this specification.

BRIEF DESCRIPTION OF THE DRAWINGS

The present invention, however, together with further objects and advantages thereof, may best be understood by reference to the following description taken in connection with the accompanying drawings in which.

DESCRIPTION OF THE PREFERRED EMBODIMENT

Figure 1:
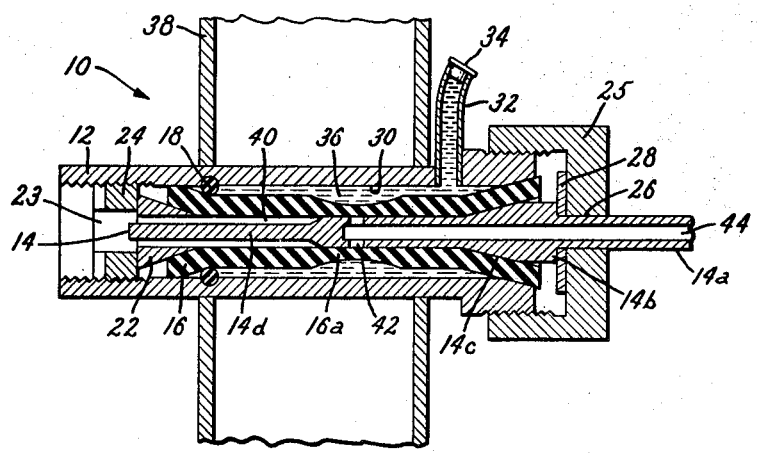
FIG. 1 is a side sectional view of a thermostatic flow controller in accordance with the subject invention with the fluid flow impeded.
Figure 2:
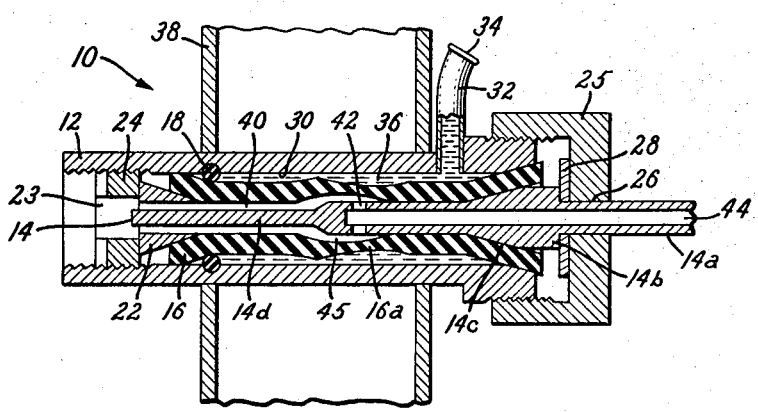
FIG. 2 is a side sectional view of the flow controller shown in FIG. 1 with the fluid flow unimpeded.

In FIGS. 1 and 2, side sectional views of a compact, lightweight and simple thermostatic control valve in accordance with the subject invention are shown. Valve 10 is comprised of a cylindrical outer casing 12; an inner rod 14; a flexible, tubular diaphragm 16; a retainer ring 18 which is used to hold diaphragm 16 against the portion of inner rod 14; an annular wedge member 22 in contact with inner rod 14 and an end of diaphragm 16; and a nut 24 with a central hole 23 therethrough threadably engaged with the internal threading in one end of casing 12 which is used to apply pressure to wedge 22 so as to seal diaphragm 16 against the inner surface casing 12. At the other end of casing 12 a cover nut 25 is threadably engaged with outside threads on casing 12. A small diameter portion 14a of inner rod 14 extends through an aperture 26 in cover nut 24. A washer 28 is interposed between an inner surface of cover nut 25 and an annular land 14b of inner rod 14 so that when cover nut 25 is tightened a tapered portion 14c of inner rod forces an end portion of diaphragm 16 against the inner surface of casing 12. In this way an annular cavity 30 is formed between diaphragm 16 and a portion of casing 12. A fill tube 32 with its associated enclosure member 34 is connected to chamber 30 to allow the chamber to be filled with a temperature sensitive material 36. The portion of valve 10 which includes chamber 30 extends through conduit 38 so that temperature sensitive material 36 in chamber 30 is in heat transfer relationship with the fluid flowing through conduit 38.

As shown in FIG. 2, inner road 14 is formed of a number of sections, the first of which, 14d, has a plurality of longitudinally extending grooves which are used to form flow passages 40. A short distance downstream from where passages 40 end, a plurality of radially extending holes 42 are provided. Holes 42 open into inner passageway 44 which extends out through the end of inner rod 14. The fluid which is to be controlled is supplied to valve 10 through hole 23 in nut 24. This fluid flows from left to right as viewed on the drawing through passages 40 and holes 42 to exit from valve 10 through inner passageway 44.

Diaphragm 16 is of a flexible material such as rubber or plastic and preferably includes a portion 16a located adjacent holes 42 which is thinner than the remaining portion of diaphragm 16. The diaphragm must be flexible but need not be resilient.

In operation, first, chamber 30 is substantially filled with a known quantity of a predetermined temperature sensitive material. The particular selection of material to be used is discussed in greater detail in succeeding paragraphs. Briefly, the material is chosen so that the desired temperature range over which the fluid flow is to be controlled is within the temperature range in which the material changes phase. The amount of material placed in the chamber is determined by the volume of the material needed to provide the desired positioning of diaphragm 16 at any given temperature within the desired temperature range. Diaphragm portion 16a forms with the outer surface of inner rod 14 adjacent holes 42 a flow path 45 whose cross-sectional area varies in accordance with the volume of material within chamber 30. When the temperature of the fluid flowing through conduit 38 and hence the temperature of material 36 is toward the lower end of the temperature range, the volume of material 36 is sufficiently small to allow diaphragm portions 16a to be positioned a substantial distance away from inner rod 14 so as to allow fluid to flow from passages 40 through holes 42 and out passageway 44. As the temperature of the fluid in conduit 38 increases, material 36 increases in volume as determined by its coefficient of thermal expansion. As the volume of material 36 increases, diaphragm portion 16a is moved closer to inner rod 14 so as to diminish the area of the flow path. When the upper limit of the desired temperature range is reached, the flow path area will be zero and diaphragm portion 16a will completely seal off holes 42 so that the flow of fluid through valve 10 will be stopped. As shown in FIG. 1, to assure that the diaphragm will move first at the area adjacent holes 42, diaphragm portion 16a is made thinner. The internal construction of valve 10 also allows expansion of diaphragm 16 past the shut-off stage to prevent damage to the valve if the temperature exceeds the upper limit of the desired temperature range.

Theoretically, any substance having a high coefficient of thermal expansion can be used as the temperature sensitive material. Factors such as desired temperature range, maximum storage temperature and accuracy of the control limits are factors affecting the selection of the temperature sensitive material. Of course, in most cases it is desirable to have the thermal control valve 10 and hence the volume of the temperature sensitive material used as small as possible. In the past, a volatile liquid and its associated vapors or a gas by itself have been used in other designs of temperature control valves. However, it has been found that either a relatively large volume of temperature sensitive material or a large temperature change or a combination thereof must be utilized in order to provide a change in volume of the material sufficiently large to actuate a valve mechanism. In accordance with the subject invention, it has been found that for control temperatures in the range of approximately 0°–200° F where control sensitivity is desired in a range of no greater than 10° F, use of a wax material is preferable. Particularly, it has been found that the coefficient of thermal expansion for a wax material during the phase change from a solid to a liquid is an order of magnitude larger than the coefficient during either the solid or the liquid phase and also larger than the coefficient of most liquids or gases. Waxes are generally available having melting ranges from 0° F to approximately 200° F. Substantially any melting range between these temperatures can be obtained by mixing particular waxes.

As an example, a mixture of polyethylene glycol waxes of two parts of a wax having a melting point of 95° F to one part having a melting point of 64° F yield a mixture whose melting range is from 85°–91° F. Within this melting range the wax mixture exhibits an extremely high coefficient of thermal expansion. For this particular example, the increase in volume over the melting range is approximately three percent.

Figure 3:
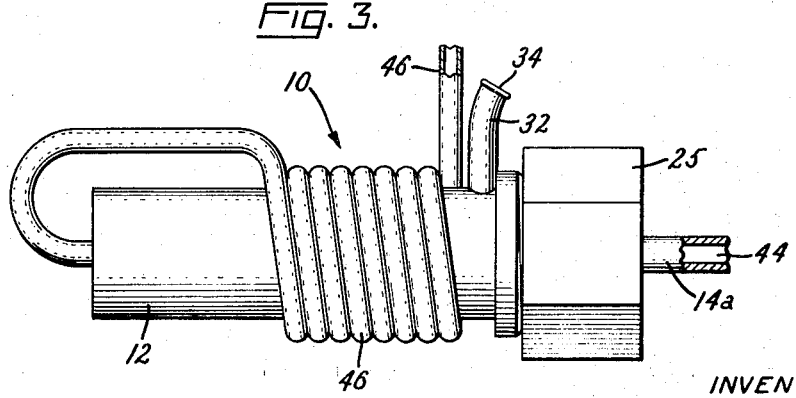
FIG. 3 is a side sectional view of another embodiment of flow controller in accordance with the subject invention.

In FIG. 3 another embodiment of thermal control valve is shown. The internal construction of this embodiment of valve is exactly the same as that shown in FIGS. 1 and 2. In the embodiment shown in FIGS. 1 and 2 the temperature sensed by the valve is the temperature of a fluid flowing through conduit 38. However, in this embodiment a tube 46 for conveying the fluid to be controlled is wrapped around casing 12 before it is connected to the input of valve 10 so that the fluid flow through valve 10 is controlled by the temperature of the fluid which is being controlled. The embodiment shown in FIG. 3 would therefore be extremely useful for controlling a heat exchange fluid used for heating wherein the expansion of the temperature sensitive wax would provide a maximum temperature cut-off control for the flow of fluid.

In all the embodiments, filler tube 32 can be used to provide a function in addition to allowing chamber 30 to be filled with temperature sensitive material. A source of pressurized fluid can be connected to filler tube 32 to allow testing of the valve or alternatively to provide a second means of control over the valve. In the latter case flow through valve 10 would be shut off either when the desired temperature limit is reached or when pressurized fluid is applied to filler tube 32.

Of course, many modifications may be made to the embodiments shown which come within the scope of the subject invention. For example, the chamber and diaphragm need not be annular in shape. Also, means other than the specific inner rod structure 14 may be utilized to provide a means associated with the diaphragm for forming a flow path for the fluid. For example, the valve may have a substantially rectangular cross-section with the chamber and diaphragm located along one of the walls. In this example a means for defining a fluid path may be a protrusion extending substantially perpendicular to the fluid flow direction so that when the temperature sensor fluid expands, the diaphragm is pushed against an edge portion of the protrusion to restrict and eventually stop the flow of fluid through the valve.

Therefore it is intended that the scope of the subject invention be limited only by the appended claims.

What I desire to secure by Letters Patent of the United States is:

1. A temperature sensitive fluid control device for controlling the flow of a fluid in accordance with a sensed temperature within a desired temperature range comprised of:

a. an input passageway;
   b. an output passageway;
   c. means for defining a closed chamber between said input and output passageways, said means including a flexible diaphragm and a rigid chamber wall;
   d. means for defining with a portion of said diaphragm a fluid flow path whose area varies in accordance with the position of said diaphragm portion; and
   e. a predetermined quantity of a temperature sensitive material having a known coefficient of thermal expansion which substantially fills said chamber wherein said material has a temperature range for the solid/liquid phase change which includes the desired temperature range; whereby the position of said diaphragm portion is determined by the volume of said material in said chamber.

2. A device as in claim 1 wherein said temperature sensitive material is a wax.

3. A device as in claim 1 wherein said diaphragm portion is thinner than the remaining portion of said diaphragm.

4. A device as in claim 1 further including a control fluid in thermal contact with said temperature sensitive material so that the flow path area varies in accordance with the temperature of said controlling fluid.

5. A device as in claim 4 further including means for directing said controlling fluid to said input passageway.

* * * * *